United States Patent [19]

Emmert

[11] Patent Number: 5,081,810
[45] Date of Patent: Jan. 21, 1992

[54] BUILDING PANEL

[75] Inventor: Raymond L. Emmert, Oklahoma City, Okla.

[73] Assignee: Emmert Second Limited Partnership, Oklahoma City, Okla.

[21] Appl. No.: 536,370

[22] Filed: Jun. 11, 1990

[51] Int. Cl.[5] ........................... E04B 7/02; E04B 1/00
[52] U.S. Cl. .................................... 52/221; 52/309.9; 52/309.4; 52/785; 52/580
[58] Field of Search ................ 52/309.2, 309.4, 309.9, 52/309.11, 285, 309.3, 595, 806-809, 580, 785, 90, 92, 220, 221, 586, 309.4

[56] References Cited

U.S. PATENT DOCUMENTS

| | | | |
|---|---|---|---|
| 3,147,336 | 9/1964 | Mathews | 174/35 |
| 3,363,378 | 1/1968 | Palfey | 52/309 |
| 3,462,897 | 8/1969 | Weinrott | 52/285 |
| 3,785,913 | 1/1974 | Hallamore | 52/309.11 |
| 4,163,349 | 8/1979 | Smith | 52/281 |
| 4,443,988 | 4/1984 | Coutu | 52/309.9 |
| 4,578,909 | 4/1986 | Henley et al. | 52/210 |
| 4,628,650 | 12/1986 | Parker | 52/309.3 |

OTHER PUBLICATIONS

Agricultural Engineering, Oct., 1960, article entitled Stressed Skin Panel Design, by authors Nelson, Mahoney, Fryrear and Martinson, pp. 686–689, 697–699.

Primary Examiner—James L. Ridgill, Jr.
Attorney, Agent, or Firm—Robert K. Rhea

[57] ABSTRACT

A sandwich-type structural panel is formed by a core of insulating material having opposing skins or face surfaces bonded to opposing planar sides of the core and defining rectangular recesses at each end of the panel.

The panel is further characterized by elongated rigid stiffeners extending coextensive with the thickness of the core material and its length between the encapsulating skins.

The spacing of the stiffeners is such that a point load of a fixed amount centrally applied to either planar surface or longitudinal edge of the panel generates a load deflection ratio of 1:1 between the central portion of the panel and its respective edge, thus providing a balanced efficient panel.

9 Claims, 2 Drawing Sheets

BUILDING PANEL

BACKGROUND OF THE INVENTION

1. Field of the Invention

This invention relates to sandwich panels and more particularly to an insulating, reinforced building panel particularly adapted for modular construction.

Insulating sandwich type building panels are well known and are widely used in the construction of enclosures for various purposes particularly where the moisture content and temperature of an enclosure is to be maintained at a predetermined value.

Generally the sandwich panels are of standard dimensions, the same as plywood and the like, comprising skins or face panels, relatively thin when compared with their other dimensions, forming face sheets which are separated and adhered to a core member formed from heat and cold insulating material such as foamed plastic, or the like.

These insulating panels many times contain a peripheral frame for adding rigidity to the panel and forming a means for joining one panel to another in edge-to-edge fashion.

Since the face sheets and the core member of non-reinforced sandwich panels are subject to failure when a lateral force is centrally applied to one of its sides or edges, it is necessary, for most building structures, that such panels be strengthened by bracing or stiffening members to form a panel which may be used in modular construction.

This invention provides such a stiffening of sandwich panels to increase their rigidity, efficiency and utility as structural members for construction purposes.

2. Description of the Prior Art

U.S. Pat. No. 3,147,336 is an example of frame edge members of a sandwich panel having a plastic or foam core with the panel being covered by opposing thin sheets.

The most pertinent prior patent is believed to be U.S. Pat. No. 3,363,378 which discloses thin skins or face panels which enclose insulating material and features longitudinal and transverse stiffening members embedded within the core ¼ of the panel width dimension from its respective longitudinal sides and its respective ends.

This invention is distinctive over the above named patents by forming a sandwich panel which features a core member interposed between face sheets or skins and adhered thereto by suitable bonding including a pair of longitudinally extending panel stiffening members longitudinally separating the core portion into three sections extending between the skin surfaces and bonded to the respective adjacent edges of the core sections.

Such a panel being preferably rectangular in configuration and having a length at least twice its width provided at its respective end portions with a recess formed by the skins or face panels projecting beyond the respective end limit of the panel core a distance sufficient to receive dimension lumber therein for joining a plurality of such panels in end edge to end edge relation.

Additionally, for use as wall forming panels, the insulating core is provided with preformed raceways or channels for receiving plumbing or electrical wires.

SUMMARY OF THE INVENTION

This building panel is formed by a pair of skins or face sheets bonded to an insulating core to form a panel of standard building panel dimensions normally having a length at least twice its width.

The core is divided into three longitudinal sections, the major central section being ⅔ the width of the panel and two elongated longitudinal edge sections each being 1/6 the width of the panel.

An elongated planar stiffener or bracing member coextensive with the length of the insulating core sections is interposed between the core sections at the 1/6 width position of the panel.

Longitudinal outer edge surfaces of the outermost core sections lie in a plane common to the surface of the adjacent edges of the respective skin or face. The skins or faces of the panel project beyond the end limit of the core sections a distance sufficient to nest a length of dimension lumber or other structural component when inserted therein.

The outward longitudinal edge portions of the outermost core sections are beveled for receiving splicing members joining one longitudinal edge of one panel to another.

One end surface of the core sections is provided with a central groove extending transversely of the panel for receiving wiring or piping.

Additionally, each outer core section is provided with a longitudinal groove communicating with the panel end transverse groove and extending toward the other end of the panel adjacent the outwardly disposed surface of the respective reinforcing or stiffening member.

The principal object of this invention is to provide an improved, reinforced sandwich panel having raceways for the reception of wiring which may be joined to like panels in edge-to-edge relation to form a substantially rigid panel for modular construction.

DESCRIPTION OF THE PREFERRED EMBODIMENTS

Figure 3:
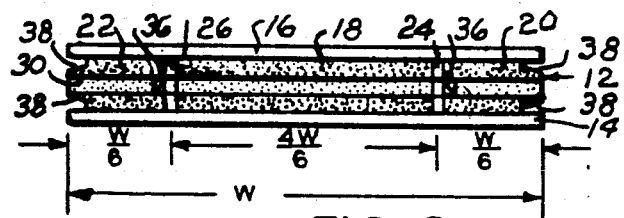
FIG. 3 is a top view of FIG. 1.

Like characters of reference designate like parts in those figures of the drawings in which they occur.

In the drawings:

The reference numeral 10 indicates the panel, per se, which is elongated rectangular in general configuration having predetermined length and width dimensions substantially equal with presently used laminated wood building panels for example, having a length twice or three times its width.

The panel 10 comprises a core means 12 having overlying face sheets or skins 14 and 16 structurally bonded to opposing flat faces of the core. The skins 14 and 16 may be oriented strand press boards, plywood or other suitable material $\frac{1}{8}''$ (0.31 cm) to $\frac{3}{4}''$ (1.905 cm) thickness.

The core 12 is preferably formed from polystyrene or polyurethane having a density of $\frac{1}{2}$ lb (0.2 kg) to 2 lbs (0.9 kg) per cubic foot. The core density and skin thickness is selected in accordance with the building or structure to be erected. The core is longitudinally divided to define an elongated central core section 18 and two elongated core side sections 20 and 22, respectively. Elongated rigid stiffeners 24 and 26 coextensive with the length and thickness of the core sections are interposed between the central section 18 and the respective elongated core side section 20 and 22. The stiffeners are relatively thin when compared with the thickness of the core sections.

The combined width of the core central section 18 and its two elongated side sections 20 and 22 and the stiffeners 24 and 26 is substantially equal to the width w of the panel.

By way of example, assuming the panel 10 is of standard panel building size, 4×8 feet (1.22 M by 2.44 M), the width of the core longitudinal edge sections 20 and 22 is w/6, where w is the width of the panel. The intermediate or major section of the core 18 is 4w/6. Stated another way, the position of the stiffeners 24 and 26 is 1/6 the width of the panel 10 from its respective longitudinal side edge and the central core section 18 is $\frac{2}{3}$ of the width of the panel.

The length of the panel may be any selected desired dimension nw where n is any positive integer and w is the width of the panel.

The core 12, stiffeners 24 and 26 and skins 14 and 16 are bonded together as a unit by glue, not shown. A preferred glue is a water base interior-exterior structural adhesive which will not creep under shear load in structural utilization of the panel as a function of time, temperature and panel loading.

The above spacings and ratio of the panel 10 components are critical in forming my sandwich-type building panel so that it has optimum load bearing qualities and torsion resistance.

Figure 5:
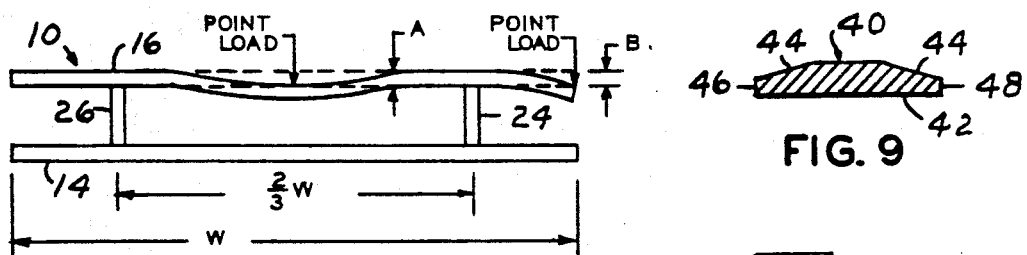
FIG. 5 is a diagram omitting the core and illustrating load deflection of my panel.

For example, in a panel utilizing a core density of 1 lb (0.45 kg)/cu ft and a skin thickness of $\frac{3}{8}''$ (0.93 cm) and the panel used as a simple load bearing flat beam structure as in a floor, the point load deflections of the panel skins are balanced when the distance between the longitudinal centers of stiffeners 24 and 26 is $\frac{2}{3}$ the panel width. At this spacing a point load (FIG. 5) such as the weight of a person or object on the center portion of the panel 10 results in a deflection of distance A. An equal point load on a longitudinal edge of the panel 10, will result in an equal distance of deflection B.

The deflection under simple point loading of the panel 10 edge is equal to the center loading of the panel 10 under an equal loading condition or a ratio of 1:1. With the spacer-stiffeners spaced apart a distance of $\frac{2}{3}$ w, the panel load deflection ratio between the longitudinal edge of the panel and center of the panel is not only equal but the stress distribution in the panel skins is more uniform than if the stiffeners are spaced differently.

Figure 6:
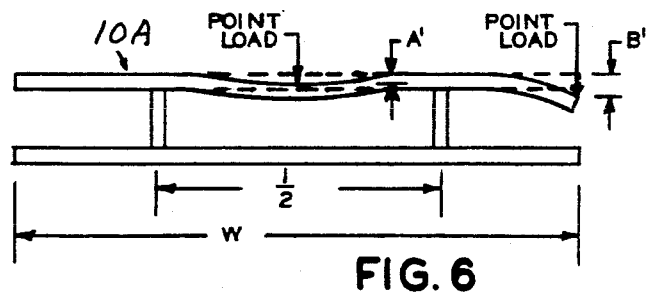
FIG. 6 is a similar diagram illustrating load deflection of panels having different spacing of stiffeners.

Referring also to FIG. 6 when the stiffeners are spaced apart $\frac{1}{2}$ w, as in an identically constructed panel 10A then the ratio of the deflection due to shear lag, under equal simple point loading of the center and the edge is A' and B', respectively, for a ratio of 1:1.85. It seems readily apparent that for a given acceptable limit of panel surface deflection, a panel configured as in FIG. 5, that is, stiffeners spaced at $\frac{2}{3}$ w may utilize a lighter weight less expensive skin than a panel configured as in FIG. 6 where the stiffeners are spaced apart $\frac{1}{2}$ w.

In addition to the above very important difference an obvious advantage of the panel 10 versus the panel 10A, the panel 10, when finish laminated, becomes a "box beam" and thus its torsion strength is greater than panel 10A.

Another advantage of placing the stiffeners further apart as contrasted with the panel 10A is realized during the manufacturing process when high pressure is applied to a superposed stack of panels during glue drying in a press. Simply stated, when the stiffeners are placed further apart as in FIG. 5 a stack of panels being laminated is more stable and panel distortions and warpage is minimized.

Figure 1:
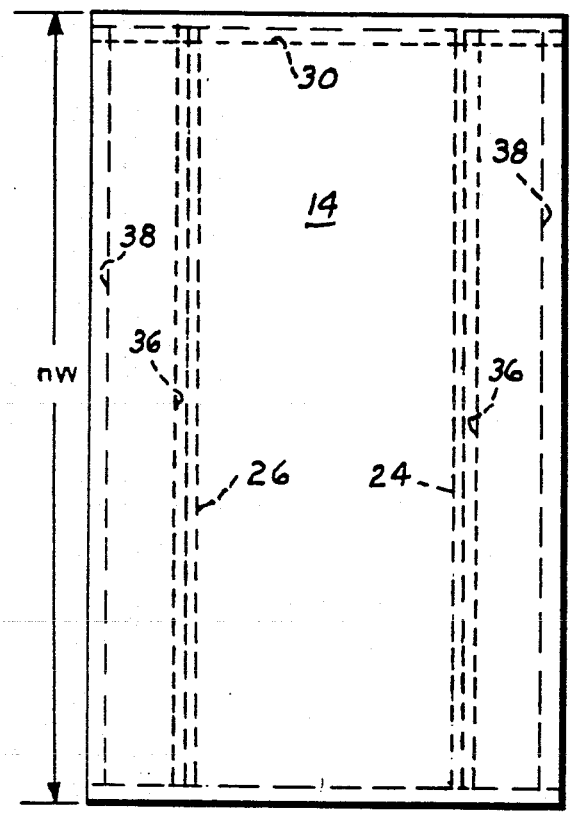
FIG. 1 is a side elevational view of the panel.
Figure 7:
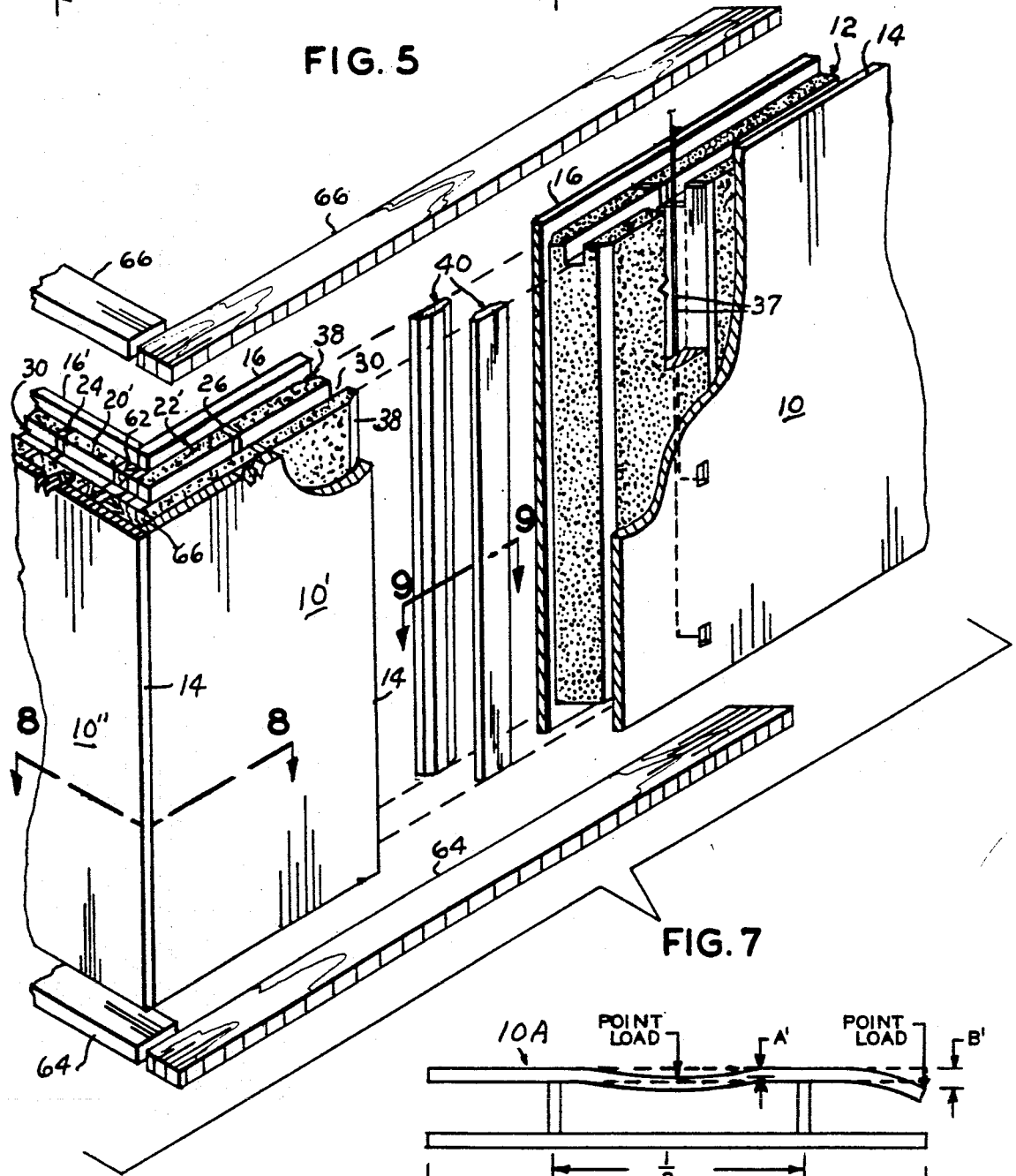
FIG. 7 is a fragmentary exploded perspective view, partially in cross section, of a fragment of a building wall constructed from a plurality of the panel members.

During the manufacturing process, the top end surface of the core sections and the stiffeners 24 and 26, as viewed in FIG. 1 are provided with a central groove 30 extending the full width of the core 12. Aligned grooves 30 enable electrical wiring 37 to be conveniently laid in place after multiple panels have been juxtaposed in a wall or complex arrangement of walls. Previous sandwich panels have required electrical wiring to be fed through passageways as each panel is being joined to another and often exiting the panel system into other cavity areas with a change in wall direction. Similarly, the longitudinal edge surface of the respective elongated core outer sections 20 and 22 on its surface abutting the respective stiffener 24 and 26 is provided with a longitudinally extending recess or vertical groove 36 for receiving electrical wiring 37 (FIG. 7).

Figure 2:
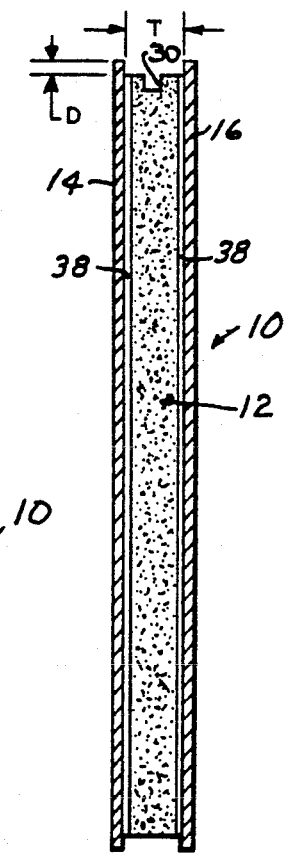
FIG. 2 is a right edge elevational view of FIG. 1.

The length of the core sections 18, 20 and 22 is less than the overall length of the skins 14 and 16 by a distance D (FIG. 2) for the purpose presently explained. The thickness of the core T is substantially equal to the transverse dimension of commonly used dimension lumber generally referred to as a 2×4 and the distance D is equal to the thickness of a 2×4 so that a 2×4 may be disposed within the recess formed at each end of the panel by the skins 14 and 16 projecting beyond the end limits of the core for the reasons presently explained.

Figure 4:
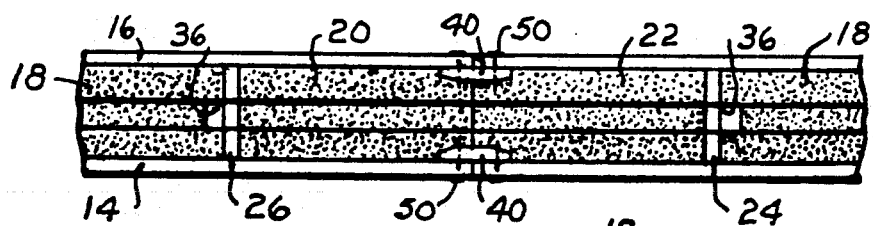
FIG. 4 is a fragmentary horizontal sectional view to a different scale, illustrating the manner of longitudinally joining the panels in edge to edge relation.
Figure 8:
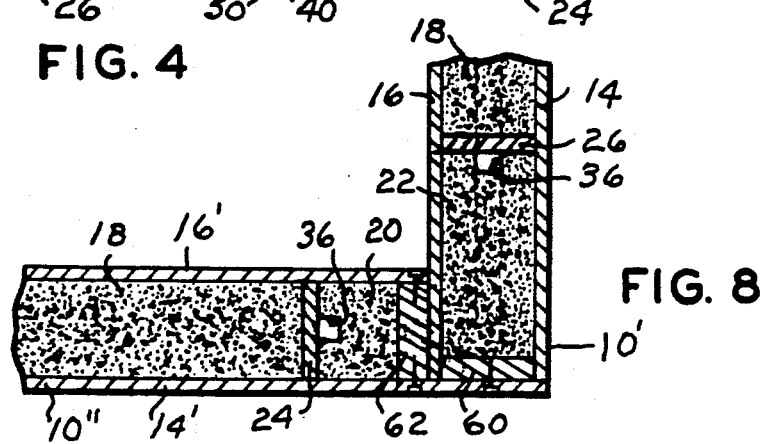
FIG. 8 is a horizontal cross-sectional view to a similarly enlarged scale taken substantially along the line 8—8 of FIG. 7; and, FIG. 9 is a horizontal cross-sectional view taken substantially along the line 9—9 of FIG. 7.

The longitudinal outward edge portion adjacent the inner surface of the respective skin 14 and 16 of each of the elongated core sections 20 and 22 are angularly beveled or cut away to form outwardly converging edge surfaces 38 for the purpose of joining adjacent longitudinal edges of a pair of panels, as presently explained. Core surface shading in the groove 30 and on the beveled edges 38 has been omitted for clarity in FIG. 7. As illustrated by FIG. 4, the longitudinal edges of the panels 10 are joined by a pair of panel splices 40, one being shown in enlarged cross sectional detail (FIG. 9).

The longitudinal length of each splice 40 is equal with the longitudinal dimension of the core 12 and the splice is relatively thin when compared with the thickness of the core.

One longitudinal side surface 42 of each splice is planar for cooperative reception by the inward surfaces of the respective skin 14 and 16 adjacent the respective beveled edge surface 38 of the core. The respective longitudinal edge portions of the side of the splice 40 opposite the side 42 is beveled as at 44 in diverging relation toward its respective longitudinal edge 46 and 48 on an angle complementary with the core beveled edges surfaces 38 for cooperative insertion between abutting longitudinal edges of core edge sections 20 and 22 and the abutting edge portions of the skins overlapping the core beveled edges 38.

Bonding material coating the splices 40 and the recesses formed by the beveled core edges 38 and the inward surfaces of the skins secure the splices in place and join one longitudinal edge of one panel 10 to an adjacent longitudinal edge of an adjoining panel. The splices being further secured in place as by pins or nails 50.

Referring more particularly to FIG. 7, panels 10 and 10' are in longitudinal edge to edge wall forming relation and a panel 10'' cooperates with panel 10' to form a wall corner.

In manufacturing panels for a particular building certain panels are "designated" panels in accordance with architectural engineering requirements. The panels 10' and 10'' are an example of wall corner "designated" panels.

The longitudinal edge surface of the core section 22' of the panel 10' is longitudinally cut away to form a recess equal to the dimension D (FIG. 2) for receiving a length of dimension lumber 60, such as a 2×4 coextensive with the longitudinal length of the core sections.

The skin 16' of the panel 10'' is longitudinally cut away along the edge of its core portion 20' a distance equal to the thickness of the panel 10' so that the severed edge of the skin 16' may abut the outer surface of the skin 16 of the panel 10'.

Similarly, the longitudinal edge of the core section 20' of the panel 10'' is recessed inwardly of the severed edge of the skin 16' a combined distance equal to the panel 10' core thickness and the distance D (FIG. 2) for receiving the core 22' edge portion and similarly receiving a second panel stiffening 2×4 member 62. This panel joining member 62 and the skin 16 of the panel 10' are transversely grooved in cooperation with the top grooves 30 of the panels 10' and 10'' which intersect at the corner formed by the two panels 10' and 10''.

Initially, the panels 10, 10' and 10'' are positioned over sole plates 64 nested by the recesses formed in the depending edge surface of the respective panel. Similarly, after assembly the top recesses of the several panels receive top plates 66 thus forming a rigid wall surface.

Obviously the invention is susceptible to changes or alterations without defeating its practicability. Therefore, I do not wish to be confined to the preferred embodiment shown in the drawings and described herein.

I claim:

1. A generally rectangular building panel, comprising:
    a core of plastic foam material having opposing sides and having longitudinal edge surfaces and having opposing end surfaces;
    a pair of panel stiffeners extending the entire thickness and length of the core material,
        said pair of stiffeners being symmetrically spaced-apart ⅔ w
        where w is the width of the panel; and,
    panel skin means bonded to the major faces of the core material and projecting a predetermined distance beyond the opposing end surfaces of the core material for forming a structural member receiving recess in the respective end surface of the panel.

2. The building panel according to claim 1 in which opposing center edge portions of the respective longitudinal edges of the core are spaced inwardly with respect to the inward surface of the skins to form longitudinal recesses open toward the panel longitudinal side edge surface and further including:
    elongated panel splices interposed between confronting longitudinal edge surfaces of a pair of said panels, when disposed in a single plane, and cooperatively nested by the core longitudinal recesses; and,
    means for joining said splices to said skins.

3. The building panel according to claim 1 in which one end surface of said panel core is provided with a channel-like groove medially its thickness and communicating with the adjacent panel end recess.

4. The building panel according to claim 1 in which the panel core comprises an elongated central section interposed between said stiffeners and a pair of similarly elongated edge sections respectively abutting said stiffeners opposite the central section,
    said core edge sections each having a longitudinal coextensive groove in its surface adjacent the respective stiffener.

5. The building panel according to claim 4 in which:
    the width of said core central section is substantially ⅔ w; and,
    the width of each said core edge section is substantially 1/6 w, where w is the width of the panel.

6. A generally rectangular laminated building panel, comprising:
    a core of insulating material having longitudinal edge surfaces and opposing end surfaces;
    a pair of rigid planar panel stiffeners extending the entire thickness and length of the core material,
        said pair of stiffeners being symmetrically disposed in lateral parallel spaced relation ⅔ w
        where w is the width of the panel; and,
    panel skin means bonded to the major faces of the core material and projecting a predetermined distance beyond the opposing end surfaces of the core material for forming a rectangular recess in the respective end surface of the panel.

7. The building panel according to claim 6 in which the panel skin means includes a pair of panel skins and in which longitudinal edge surfaces of designated pairs (10'—10'') of said panels intersect to form right angular walls and in which:
    a first pair of panel skins (14—16) projecting a predetermined distance beyond one longitudinal edge of the core of one designated panel (10') of said pair of panels for forming a structural corner member receiving recess;
    a structural corner member (60) in the recess;
    one panel skin of a second pair of panel skins (14'—16') projecting beyond one longitudinal edge of the core of the other designated panel (10'') of said pair of panels a distance equal to the combined thickness of said one designated panel (10') of said pair of panels and a second structural corner member (62); and,
    the adjacent longitudinal edge surface of the other panel skin (16') of her panel skin
    of said second pair of panel skins being spaced inwardly with respect to the longie of
    said second panel skin (14') a distance equal to the thickness of the said one designated panel (10').

8. The building panel according to claim 6 in which the opposing outer edge portions of the respective longitudinal edges of the core are beveled inwardly in converging relation toward the adjacent outer longitudinal edge surface of the core to form longitudinal recesses open toward the panel longitudinal edge surface and further including:

cooperating elongated rigid panel splices interposed in the recesses formed between confronting longitudinal edge surfaces of a pair of said panels when disposed in edge to edge relation, and, means for rigidly attaching said splices to said skins.

9. The building panel according to claim 8 in which one end surface of said panel core and a cooperating end surface of each said stiffener is centrally provided with a channel-like groove communicating with the panel end recess.

* * * * *